United States Patent
Uhlenberg et al.

(10) Patent No.: US 7,852,610 B2
(45) Date of Patent: Dec. 14, 2010

(54) FLAMEPROOF APPARATUS USING NON-GROUNDED ENERGY-LIMITING BARRIER

(75) Inventors: Ronald L. Uhlenberg, Marshalltown, IA (US); Stephen G. Seberger, Marshalltown, IA (US); Riyaz M. Ali, Austin, TX (US); Jimmie L. Snowbarger, Marshalltown, IA (US); Clyde T. Eisenbeis, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 670 days.

(21) Appl. No.: 11/626,760

(22) Filed: Jan. 24, 2007

(65) Prior Publication Data
US 2007/0183108 A1    Aug. 9, 2007

Related U.S. Application Data

(60) Provisional application No. 60/761,801, filed on Jan. 24, 2006.

(51) Int. Cl.
*H02H 3/20* (2006.01)
(52) U.S. Cl. .................................. 361/111; 361/91.1
(58) Field of Classification Search ................ 361/111, 361/765, 58, 91.1; 700/286; 323/266
See application file for complete search history.

(56) References Cited

U.S. PATENT DOCUMENTS

| | | | | |
|---|---|---|---|---|
| 3,527,985 A | * | 9/1970 | Brown ........................ | 361/55 |
| 3,614,539 A | | 10/1971 | Hallenbeck .................. | 317/99 |
| 3,631,264 A | * | 12/1971 | Morgan ...................... | 327/309 |
| 4,649,288 A | * | 3/1987 | Barry et al. .................. | 307/84 |
| 4,796,159 A | | 1/1989 | Miksche ...................... | 361/429 |
| 4,958,256 A | | 9/1990 | Parkhomenko et al. ...... | 361/331 |
| 5,014,156 A | * | 5/1991 | Bruch et al. .................. | 361/58 |
| 5,144,517 A | * | 9/1992 | Wieth .......................... | 361/55 |
| 5,654,885 A | | 8/1997 | Mayhew et al. ............. | 364/181 |
| 5,838,547 A | * | 11/1998 | Gane et al. ................... | 361/765 |
| 5,838,589 A | * | 11/1998 | Nail et al. .................... | 700/286 |
| 6,062,095 A | | 5/2000 | Mulrooney et al. ......... | 73/866.5 |
| 6,089,269 A | | 7/2000 | Essam .................... | 137/624.15 |
| 6,154,683 A | | 11/2000 | Kessler et al. ............... | 700/150 |

(Continued)

FOREIGN PATENT DOCUMENTS

DE   42 33 108   4/1994

(Continued)

OTHER PUBLICATIONS

International Search Report for PCT/US2007/060990, dated Jun. 20, 2007.

*Primary Examiner*—Jared J Fureman
*Assistant Examiner*—Angela Brooks
(74) *Attorney, Agent, or Firm*—Marshall, Gerstein & Borun LLP

(57) ABSTRACT

A device intended to meet flameproof approval requirements is configured to have two compartments separated by an energy-limiting barrier. The first compartment of the device houses the wiring terminations that bear ignition-capable energy and, therefore, must be flameproof. The energy-limiting barrier is configured to limit the energy that can reach the second compartment to a level that is not ignition capable. This allows the second compartment to be safe without meeting the flameproof requirements, and allows user-interface elements such as switches and indicators to be designed in a more cost-effective manner.

39 Claims, 4 Drawing Sheets

U.S. PATENT DOCUMENTS

| | | |
|---|---|---|
| 6,192,321 B1 | 2/2001 | Grumstrup et al. .......... 702/113 |
| 6,294,732 B1 | 9/2001 | Hoffmann et al. ............. 174/50 |
| 6,397,322 B1 | 5/2002 | Voss |
| 6,556,447 B2 | 4/2003 | Cudini et al. ................ 361/752 |
| 6,574,652 B2 | 6/2003 | Burkhard ....................... 709/1 |
| 6,639,433 B1 | 10/2003 | Heckenbach ................ 327/108 |
| 6,708,834 B2 | 3/2004 | Hagerman, III ............ 220/4.02 |
| 6,750,808 B2 | 6/2004 | Faust .......................... 342/124 |
| 6,862,547 B2 | 3/2005 | Snowbarger et al. ........ 702/114 |
| 6,885,949 B2 | 4/2005 | Selli ............................ 702/57 |
| 7,557,548 B2 * | 7/2009 | Fey ............................ 323/266 |
| 2004/0252428 A1 * | 12/2004 | Junker .......................... 361/58 |
| 2005/0013254 A1 | 1/2005 | Kuroda et al. ................ 370/241 |
| 2005/0024160 A1 | 2/2005 | Vazach et al. ............. 333/81 R |
| 2005/0104077 A1 | 5/2005 | Song et al. ..................... 257/94 |
| 2005/0109395 A1 | 5/2005 | Seberger ........................ 137/8 |
| 2008/0285186 A1 * | 11/2008 | Kothari et al. ................. 361/56 |

FOREIGN PATENT DOCUMENTS

| | | |
|---|---|---|
| EP | 0 359 912 | 3/1990 |
| GB | 2 139 830 | 11/1984 |

\* cited by examiner

FLAMEPROOF APPARATUS USING NON-GROUNDED ENERGY-LIMITING BARRIER

CROSS-REFERENCE TO RELATED APPLICATION

This application is based on U.S. Provisional Patent Application Ser. No. 60/761,801, filed Jan. 24, 2006, the entirety of which is hereby incorporated by reference herein.

DESCRIPTION OF THE RELATED ART

The present invention relates generally to process control systems and, more specifically, to a system and devices that may be safely implemented in hazardous environments without conventional intrinsically safe barriers and without complete enclosure by a flameproof housing that would normally be required.

DESCRIPTION OF THE RELATED ART

In some process control applications, some process control devices may be used in hazardous environments presenting a significant risk of an explosion if a spark or flame is produced by the process control devices. In order to safely operate and perform process control in such hazardous environments, standards have been developed for protecting against explosions. The two most common accepted approaches are by providing flameproof housings for the process control devices, or by providing intrinsically safe energy limitation in the circuits connected to the process control devices such that sparks or flames will not be generated by the devices either during normal operations or during failures of the devices.

Under the flameproof housing standards, device housings are configured to prevent flames from propagating from the housings in the event of an explosion or spark within the housings. For example, the walls of the housing may be securely sealed, and the openings through the housing walls through which power and communication lines pass are configured to prevent flames from escaping the housing. To prevent flames from escaping the openings, the openings may be filled or plugged with a flame-retardant, pressure-bearing potting material that prevents a flame from passing through the opening, or the openings may be configured to provide gaps that do not provide enough room for flame to get out through the gaps.

Under the intrinsically safe operating standards, the voltage and/or current under which the process control devices operate is provided at a level that is not sufficient to generate a spark in the event of a failure in the connections or circuitry of the devices. Consequently, the operating voltage may be limited to a specified maximum voltage to prevent the generation of sparks. By preventing the generation of sparks, the intrinsically safe devices will not cause a fire or explosion in normal operation or in the event of a failure.

While process control devices operating under the standards discussed above provide the necessary fire and explosion safety in hazardous environments, the standards also create limitations on implementing and performing process control in the hazardous areas. The flameproof housing requirements are quite stringent, and make it difficult to take advantage of convenient process control and monitoring features, such as LCD displays, buttons, switches and the like. These features cannot be implemented on the exterior of the flameproof housings, and it is difficult and expensive to configure flameproof housings in a manner in which these features may be utilized. Intrinsically safety barriers typically eliminate the need for flameproof enclosures, but these barriers are expensive to purchase and install. An intrinsically safe barrier typically requires an earth ground to limit the energy available to a potential fault to earth. Providing an earth ground in many implementations is inconvenient since a solid connection to earth ground is not readily available, and provision of an earth ground may lead to excessive costs.

Additionally, process control systems are conventionally installed with all hazardous area equipment specified and installed according to one or the other of these methods. That is, all flameproof or all intrinsically safe. This is to avoid confusion among maintenance personnel due to the different practices involved with each approach. The flameproof approach does not require intrinsically safety barriers and their associated costs, whereas the intrinsically safety approach does not require the heavy housings and their associated access limitations. Therefore, a need exists to provide the energy-limited benefits of easier access to displays and controls in an installation that uses the flameproof approach to hazardous area safety.

In process control environments such as those discussed above, emergency shutdown (ESD) valves may be implemented that are configured to shutdown in the event of an emergency in the process control environment. Typically, the ESD valves are rarely operated (only in emergency situations) and may become stuck in the open or non-safe position. Hence it is desirable to implement methods to test the operation of such valves to verify their condition. In many current implementations, in particular where the ESD valves are installed in hazardous environments using the flameproof safety approach the valve control devices cannot be readily accessed to manually control or test the ESD valves. To facilitate easier, more frequent valve testing, as well as local control of the operation of the valve, it is desired to implement cost-effective local control panels that meet the requirements for use in a hazardous environment, and can be installed using flameproof installation methods.

Depending on the implementation, power may be supplied to the devices, including the ESD valves, by various sources. In some installations, power may be supplied by a typical power source, such as a 24-volt DC power input. In other installations, the process control devices may receive power from the process control network over which the devices may also exchange process control information. For example, in a 4-20 mA network, the wires connected to the devices may supply a DC current to power to the devices as well as communicate a process control signal. In some implementations, such as those associated with the HART® protocol, a digital communication signal is superimposed on the DC signal to provide control and diagnostic communications to the device. It can be appreciated by one of ordinary skill in the art that various power sources for the process control devices may exist within an installation and, therefore, a need exists for local process control panels to accommodate different power sources. Further, as the ESD valves may be implemented in hazardous environments, a need exists for providing lower-cost, easily accessible local control panels that meet the design standards for equipment installed in such hazardous environments.

SUMMARY

A device intended to meet flameproof approval requirements is configured to have two compartments separated by an energy-limiting barrier. The first compartment of the device houses the wiring terminations that bear ignition-capable energy and, therefore, must be flameproof. The energy-limiting barrier is configured to limit the energy that can reach the second compartment to a level that is not ignition capable. This allows the second compartment to be safe without meeting the flameproof requirements, and allows user-interface elements such as switches and indicators to be designed in a more cost-effective manner. The energy-limiting barrier may include a power supply energy-limiting circuit utilizing fuses and Zener diodes configured to ensure that the output of the energy-limiting barrier is maintained at the desired low energy level when voltage or current surges occur within the flameproof housing. The energy-limiting barrier may further include external connection energy-limiting circuits including diodes configured to ensure that any energy intentionally or accidentally supplied through the external connection is maintained within the voltage of the low energy output signal provided by the energy-limiting barrier. The energy-limiting barrier is not intended to limit the voltage between the circuitry and the housing of the device, but rather between any two points within the circuit. Energy discharge between the circuit and housing will be prevented by the provision of infallible spacing within the second housing.

In another aspect, a local control panel for an FSD valve is configured to receive and use power from diverse power sources. The local control panel may include communication circuitry, switches and indicators, and a communications filter configured to pass signals between the communication circuitry and the ESD valve. The local control panel may further include a plurality of power converters each configured to receive a power input signal and to convert the power input signal to a fixed voltage signal for use by the components of the local control panel. The local control panel may also include a power select switch connecting the power-converter barrier-circuit outputs to the communication circuitry, wherein the power select switch couples the output of one of the power converter barrier circuits to the components of the local control panel. In a further aspect, the power converters may be disposed within a flameproof housing having an energy-limiting barrier, while the communication circuitry, switches and indicators, and communications filter may be disposed in a non-flameproof housing and may receive the low energy output signal from the energy-limiting barrier of the flameproof housing.

DESCRIPTION OF THE PREFERRED EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
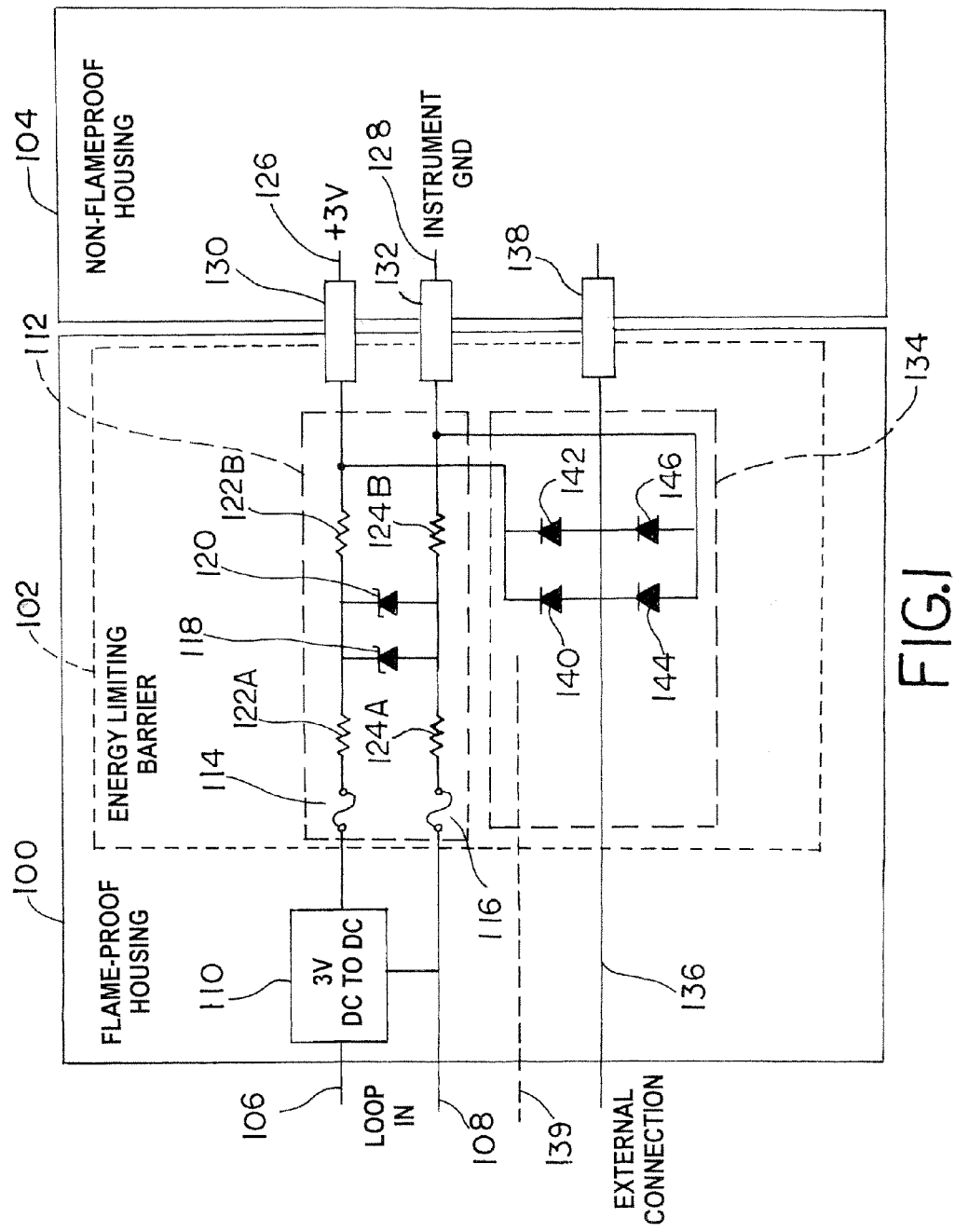
FIG. 1 is an exemplary schematic diagram of a flameproof housing containing an energy-limiting barrier and connected to a non-flameproof housing.

FIG. 1 illustrates an embodiment of a flameproof housing 100 having an internal energy-limiting barrier 102 configured to provide low energy outputs so that interface devices, such as Liquid Crystal Displays (LCDs), buttons and switches, connected to the outputs need not be considered ignition-capable (i.e. providing an ignition source in a process environment). Generally, in the illustrated embodiment, the flameproof housing 100 and energy-limiting barrier 102 are configured to ensure that a maximum voltage, such as 5 volts, is output on power supply lines having a nominal operational voltage such as 3 volts. Other external connections, for example to instruments through an external connection 136, are also limited by the barrier 102 to a non-ignition-capable voltage within the non-flameproof housing 104. However, those of ordinary skill in the art will understand that the components of the housing 100 and the energy-limiting barrier 102 may be configured as desired and/or necessary for a particular implementation to provide a particular maximum output voltage.

The flameproof housing receives power from a system, such as a distributed control system, via two wires 106, 108 carrying a current supply, for example, in a conventional 4-20 mA current loop wherein the first wire 106 supplies the current and the second wire 108 provides a return path that may be internally connected to instrument ground. The current loop comprising the two wires 106 and 108 may be, for example, associated with the communications loop, such as a 4-20 mA communication network, as well. As per the applicable safety standards, the wires 106, 108 typically enter the flameproof housing 100 through flameproof conduits. The wires 106, 108 are fed through a DC-to-DC converter 110 to reduce the working voltage to the desired level for input into the energy-limiting barrier 102.

At the output of the converter 110, the wires 106, 108 may be connected to a power source circuit 112 of the energy-limiting barrier 102 configured to ensure that the voltage output from the flameproof housing 100 to the non-flameproof housing 104 does not exceed the predetermined maximum output voltage. Accordingly, the output of the converter 110 supplies a nominal operational voltage, such as 3 volts, and is clamped to a maximum of voltage by the Zener diodes 118 and 120, such as 5.1 volts. More specifically, the power source circuit 112 may include fuses 114, 116 along the wires 106, 108, and may further include redundant parallel Zener diodes 118, 120 connected between the wires 106, 108. The fuses 114, 116 and Zener diodes 118, 120 are configured to prevent any differential voltage greater than the Zener voltage from propagating to the components in the non-flameproof housing 104. In particular, the fuses 114, 116 are selected with appropriate current and voltage ratings as to ensure the Zener diodes 118, 120 will prevent any higher voltage outputs (e.g., over their rated clamp voltage) from reaching the non-flameproof housing 104.

Moreover, the Zener diodes 118, 120 may have a breakdown voltage, such as 5.1 volts, such that the diodes 118, 120 will conduct the necessary current between the wires 106 and 108 to maintain the breakdown voltage or maximum drop between the wires 106, 108. One of ordinary skill in the art can further appreciate that the power source circuit 112 may further include resistors 122A, 124A and/or 122B, 124B along either or both wires 106, 108, as shown, to limit the current from the energy-limiting barrier to the components of the non-flameproof housing 104. At the outlet of the power source circuit 112, a voltage source line 126 and an instrument ground line 128 having the specified voltage drop pass through the outer wall of the flameproof housing 100 and are connected to non-flameproof housing 104 via flameproof compliant connections 130, 132, respectively.

In order to provide external connections between other components of the system and the components of the housings 100, 104, the energy-limiting barrier 102 may further include one or more external connection circuits 134 configured to maintain the voltage of the external connection within the prescribed limits of the energy-limiting barrier 102. For example, the devices in the non-flameproof housing 104 may be connected to remote transducer devices, switches or other devices of the process control system. In the present embodiment, an external connection line 136 passes through the flameproof housing 100 and into the non-flameproof housing 104, with all connections, such as the connection 138 between the flameproof housing 100 and the non-flameproof housing 104, being flameproof standards compliant. The external connection line 136 is connected to the high power line 126 by a first pair of redundant parallel diodes 140, 142, and to the instrument ground line 128 by a second pair of redundant parallel diodes 144, 146. One of ordinary skill in the art can appreciate that these diode pairs 140-146 ensure that the voltage on the external connection line 126 is maintained within the voltage limits of the output of the power source circuit 112 of the energy-limiting barrier 102. This circuit serves to maintain a non-ignition-capable voltage between any two points in the circuit in the non-flameproof housing. Importantly, this clamping does not control the common-mode voltage on any of the circuitry in either housing. If multiple external connections are provided with the flameproof housing 100, an external connection circuit 134 will be provided for each external connection.

With the flameproof housing 100 and energy-limiting barrier 102 of the present embodiment, it is possible to also contemplate placing ignition-capable components in the flameproof housing 100 in a hazardous environment and still provide low-power user interface components in an adjoining non-flameproof housing 104. As illustrated and described, ignition-capable components are safely contained so that a flame or explosion within the flameproof housing 100 will not escape into the surrounding environment, and the non-incendive components are installed without the difficulty and expense of configuring the flameproof housing 100 such that the user interface devices are accessible by an operator in the hazardous environment, thereby facilitating local monitoring, testing and control within the hazardous environment.

As previously discussed, it may be desirable to install devices such as LCDs, buttons, switches and the like in hazardous environments without the complexity and expense of installing a flameproof housing configured to use such devices. In fact, one of ordinary skill in the art understands that in certain environment such an installation may not even be possible. Thus, the flameproof housing 100 and energy-limiting barrier 102, as described above, provide a mechanism for installing these devices safely in a hazardous environment, i.e., in a non-flameproof housing such as in the housing 104 of FIG. 1, without the need for a custom configuration of a flameproof housing. One example of an implementation of the flameproof housing 100 and energy-limiting barrier 102 is the installation of a local control panel at an ESD valve located in a hazardous environment. In many typical installations, ESD valves are installed without local controls or monitoring, and instead are monitored at remote user interfaces. It may be desired, however, to be able to control, monitor and test the ESD valves at the valves themselves. In order to operate and to monitor and control the ESD valve, the local control panel requires connection to a power source and a communication link to the ESD valve for exchanging control signals.

Figure 2:
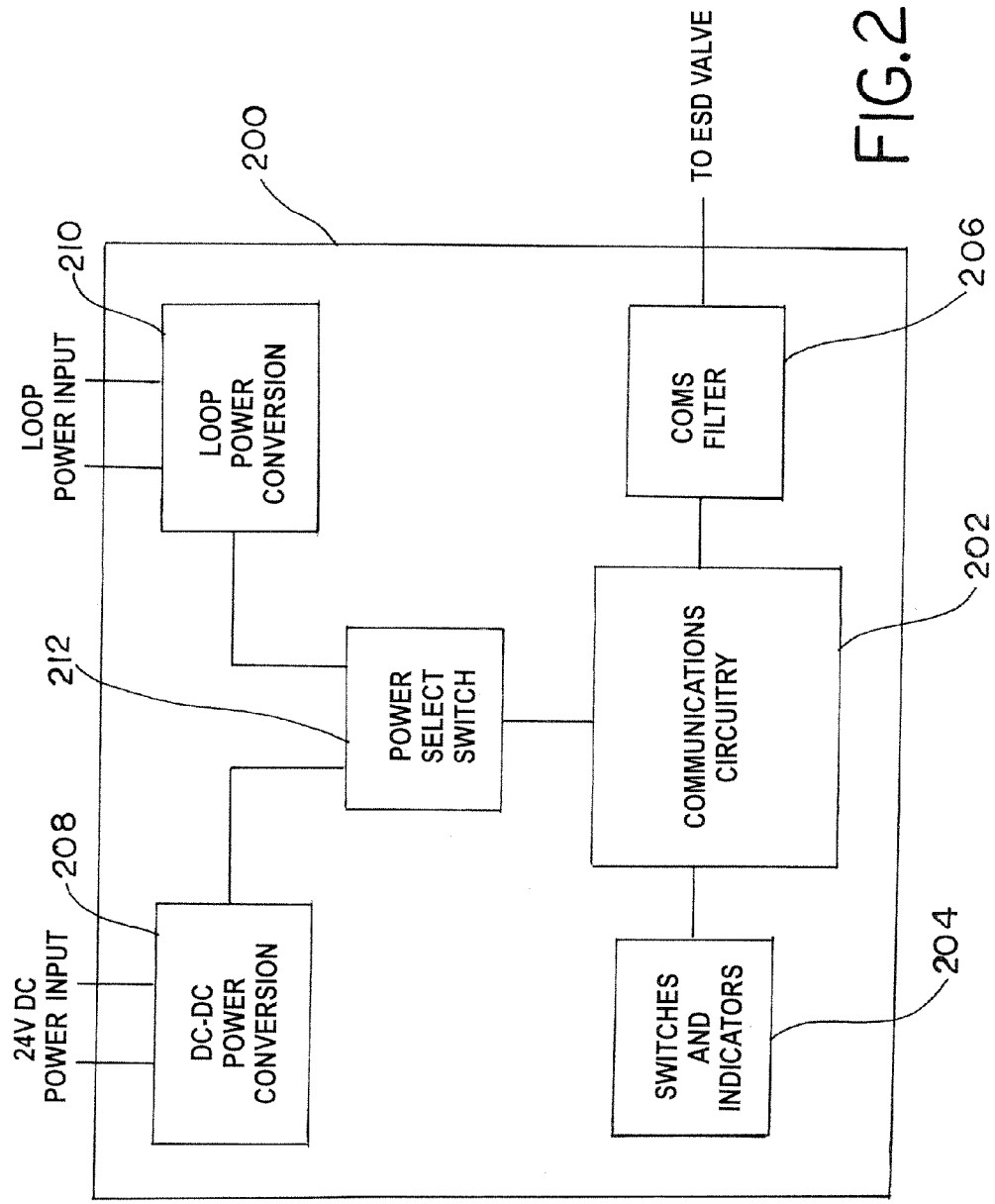
FIG. 2 is an exemplary block diagram of an embodiment of a dual power source local control panel for an emergency shutdown valve.

Referring to FIG. 2, a functional block diagram of an embodiment of a dual power source local control panel 200 is illustrated. The local control panel 200 may include communications circuitry 202, switches and indicators 204 and a communications filter 206. The communications circuitry 202 may include the processing and memory capabilities for controlling the operation of the local control panel 200 to perform necessary or desired monitoring and testing functions. Consequently, the communications circuitry 202 may include an appropriate processor, memory device(s) and interface or I/O modules necessary to communicate with the other components of the local control panel 200. The switches and indicators 204 may include the input and output devices necessary for an operator at the local control panel 200 to monitor the operation of the ESD valve, and to perform testing or manual operation of the ESD valve.

In one embodiment, the switches and indicators 204 may include separate switches for manually tripping the ESD valve, for resetting the ESD valve and for initiating a partial stroke test of the ESD valve, and separate status indicators, such as LCD displays or LED displays, corresponding to the switches and providing a visual indication of the status of each of the switches or to provide other information to a user. The switches are operatively connected to the communications circuitry 202 such that the communications circuitry 202 detects actuation of the switches and causes the corresponding functions to be performed, and the indicators are operatively connected to the switches and/or the communications circuitry 202 such that the indicators are illuminated in the appropriate manner to indicate the status of the switches and the ESD valve. The communication filter 206 is operatively connected between the communications circuitry 202 and the ESD valve, and is configured to facilitate communications between the control panel 200 and the ESD valve. In one embodiment, the communication filter 206 is configured to communicate with the ESD valve via a half-duplex serial bit stream.

As previously discussed, the local control panel 200 also requires a power source for operation of the components associated therewith. In the illustrated embodiment, the local control panel 200 is configured such that the control panel 200 may be powered by either of at least two alternate power supplies. Depending on the implementation and the availability of the power supplies at the ESD valve, the control panel 200 may be powered by either a 24-volt DC power Supply, or the control loop used to control the ESD valve. For example, the system may use a 4-20 mA control signal carried over a pair of wires and having a DC base current with, in some cases, a digital communications signal, such as HART®, superimposed over the base current. Therefore, instead of having separate power connections for each of the devices receiving a 4-20 mA control signal, the devices may be powered by the DC base current of the control signal, including the local control panel 200.

Because either power input may be available, the local control panel 200 may include a DC-to-DC power converter 208 configured to receive a 24-volt DC power input and a loop power converter 210 configured to receive the 4-20 mA signal. The converters 208, 210 are configured to convert the corresponding input signals to a Fixed voltage signal appropriate for providing power to the components of the local control panel 200 and are well known in the art. To provide the control circuitry and other components of the control panel 200 with the available power signal, the local control panel 200 further includes a power select switch 212 receiving the outputs from the converters 208 and 210, and having an output connected the communications circuitry 202. The power select switch 212 provides the available one of the power inputs to the communications circuitry 202 and other components of the local control panel 200.

Configured as described, a dual power supply local control panel 200 may be implemented in diverse process control systems and utilize the available power input without the necessity and expense of providing a type of power input that is not readily available in the system or portion of the system. Consequently, in the implementations where the devices are powered from the control signal, the local control panel 200 may be installed with a minimal amount of field wiring, and without the need for installing a particular power input. Moreover, because all the components of the local control panel 200 are powered by the output of the power select switch 212, only a single pair of wires is necessary to provide power to all the local control panel 200 components.

Figure 3:
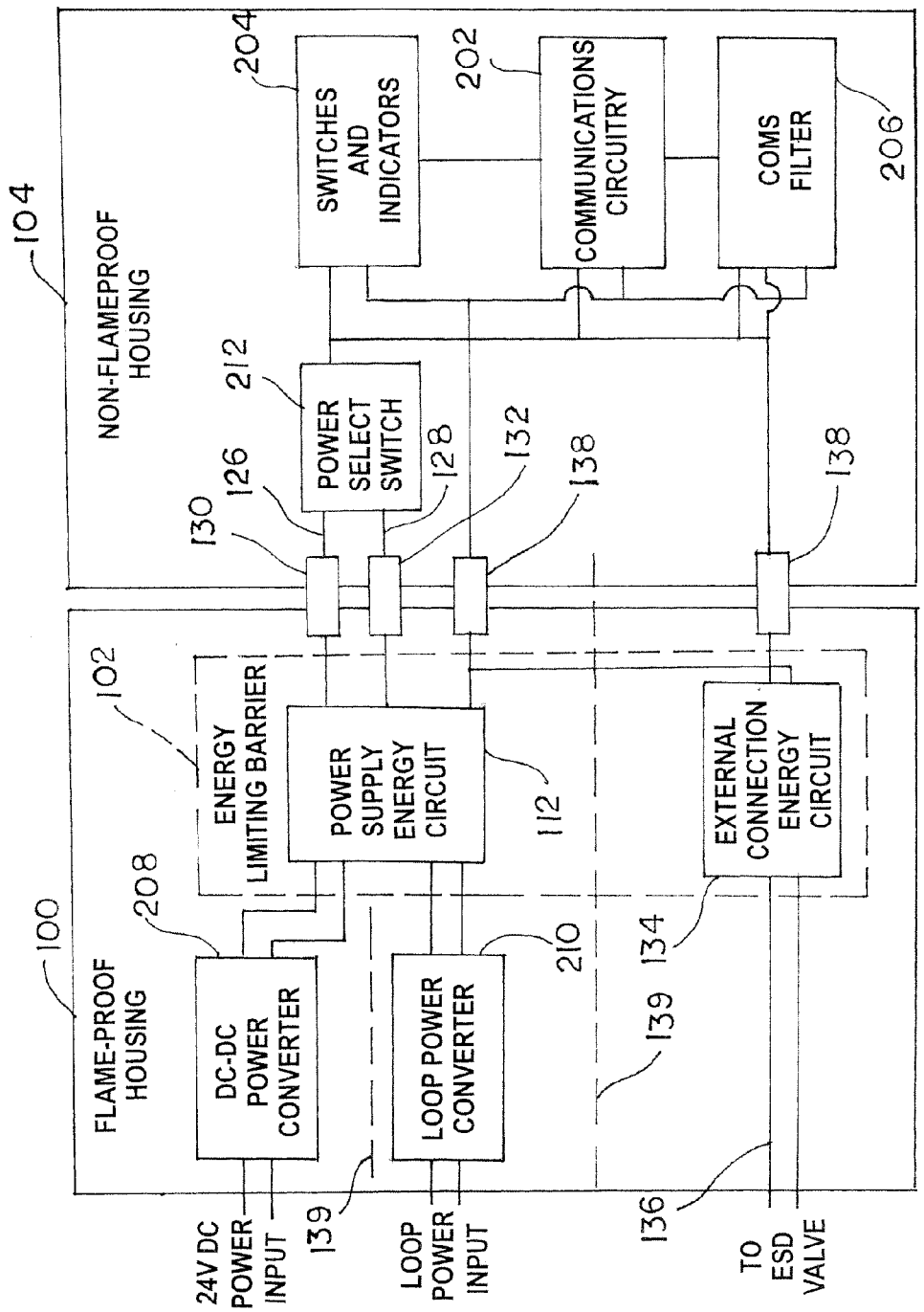
FIG. 3 is an exemplary block diagram of an implementation of the local control panel of FIG. 2 implemented in a hazardous environment with the flameproof housing of FIG. 1.

FIG. 3 illustrates an implementation of the local control panel 200 in hazardous environment in conjunction with the flameproof housing 100 having the energy-limiting barrier 102. In this embodiment, the components of the local control panel 200 may be divided between the flameproof housing 100 and the non-flameproof housing 104 as necessary to ensure safe operation of the local control panel within the hazardous environment. Consequently, the communications circuitry 202, switches and indicators 204, and the communication filter 206 and power select switch 212 may be disposed within the non-flameproof housing 104 and configured to operate on the 3-volt DC nominal input voltage provide by the power source circuit 112 of the energy-limiting barrier 102, and the power converters 208 and 210 may be disposed within the flameproof housing 100.

Within the non-flameproof housing 104, the power lines 126, 128 enter via the flameproof compliant connections 130, 132, respectively, and are connected to the power select switch 212. The selected power source is coupled through the power select switch 212 to communications circuitry 202, switches and indicators 204 and communications filter 206 to provide the necessary power to operate the components.

As the components of the local control panel 200 operate to monitor the ESD valve, the communications circuitry 202 communicates with the ESD valve via the communications filter 206. The communications filter 206 is connected to the ESD valve through the flameproof housing 100 via a separate flameproof compliant connection 138 and a separate external connection energy circuit 134. Moreover, the ESD valve is also connected to the flameproof housing 100 via a flameproof compliant connection, and the external connection energy circuit 134 corresponding to the communications filter 206 is also disposed the necessary internal separation or spacing denoted by dashed line 139 between the power loop and fuses.

One of ordinary skill in the art will understand that other configurations of the flameproof housing 100 and the local control panel 200 are possible to provide for safe implementation of the local control panel 200 in a hazardous environment. For example, the power converter 208 may be configured to provide infallible isolation of this power source such that the energy provided through this path cannot combine with the energy provided from the loop connection. One can further appreciate that additional alternate configurations of the flameproof housing 100 and local control panel 200 may also be contemplated without departing from the spirit and scope of the invention.

Figure 4:
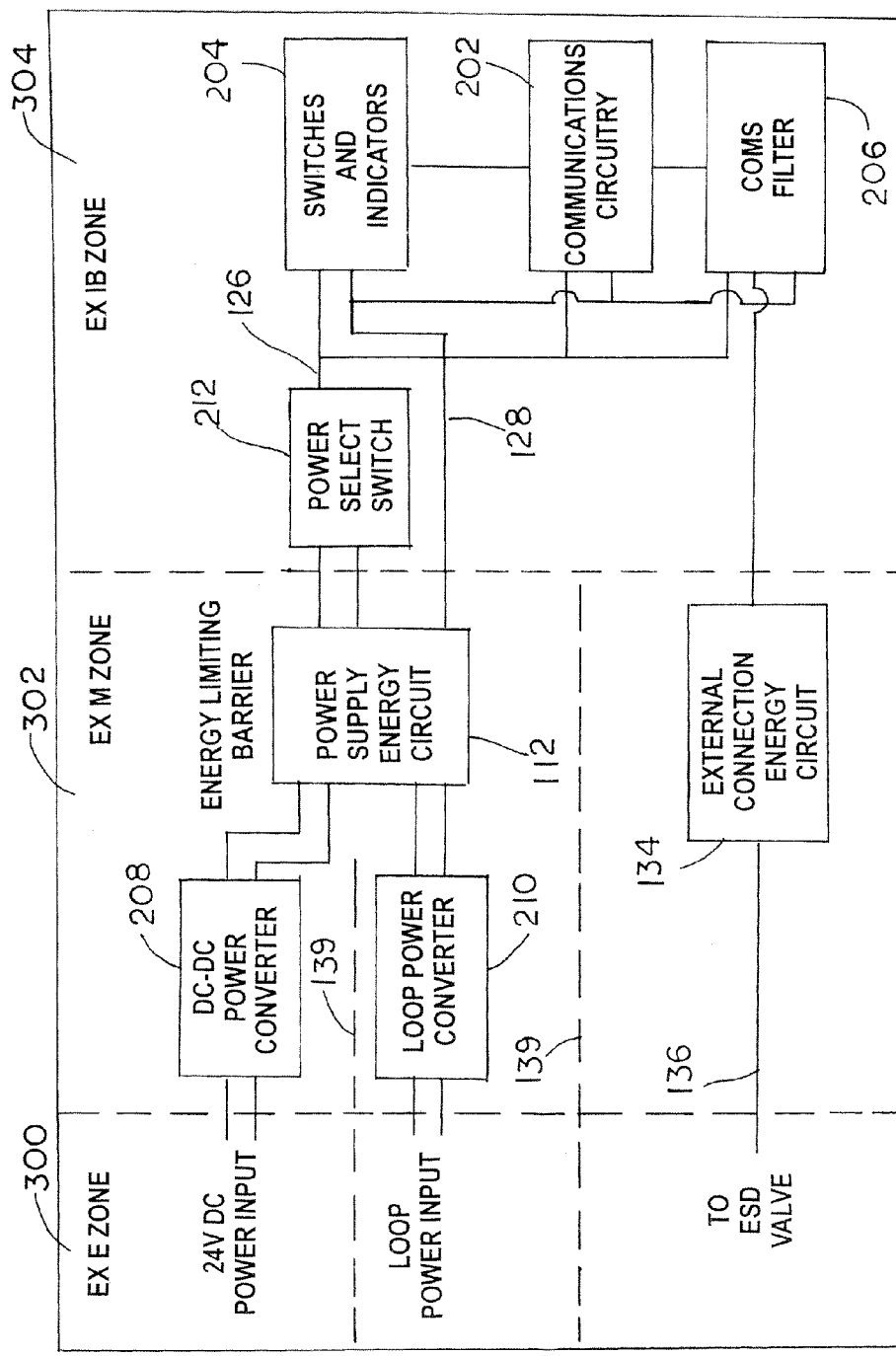
FIG. 4 is an exemplary block diagram of a non-flameproof housing containing an energy-limiting barrier complying with an "Increased Safety" standard.

Another alternate configuration that embodies the principles disclosed herein is depicted in FIG. 4. In this embodiment, there is no flameproof enclosure, but rather the overall hazardous area approval is based on the "Increased Safety" standard otherwise known to those skilled in the art as "Ex e." The enclosure in this embodiment is only required to be sealed from the environment, not flameproof. That is, there are certain spacing (separation) requirements at the wire termination points within the Ex e zone 300. Any ignition-capable circuitry is all placed under encapsulation within the Ex m zone 302, and the switching elements such as buttons and switches are located in the Ex ib zone 304 where there is no ignition-capable energy. The use of the energy-limiting barriers in this embodiment allows the use of ordinary switching elements that are much less expensive and smaller than their flameproof counterparts are. This embodiment requires no divided enclosure and no flameproof feed-through. However, the safety of the device is achieved with an integral energy-limiting approach very similar to the other embodiments, and providing the similar benefit of lower-cost, easier to implement indicators and switches in a hazardous environment.

By implementing the local control panel 200 with the flameproof housing 100 and energy-limiting barrier 102, it is possible in a hazardous environment in which an ESD valve is installed to put the high power components of the local control panel 200 (converters 208, 210) in the flameproof housing 100 and still provide the low power user interface components (communications circuitry 202, switches and indicators 204, and communications filter 206 and power select switch 212) in an adjoining non-flameproof housing 104. As discussed above, the high power components are safely contained and the lower power components are installed without the necessity of a customized flameproof housing, thereby facilitating local monitoring, testing and control of the ESD valve within the hazardous environment.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A flameproof apparatus comprising:
   a flameproof housing;
   a flameproof compliant input connection disposed through the flameproof housing to receive a wire to connect the flameproof apparatus to an external power source;
   a flameproof compliant output connection disposed through the flameproof housing and having a voltage source line;
   a voltage converter disposed within the flameproof housing and having a converter input connected to the flameproof compliant input connection and having a converter output, wherein the voltage converter converts the voltage from the external power source to a converter output voltage that is less than or equal to a predetermined maximum output voltage; and
   an energy limiting barrier disposed within the flameproof housing and having a barrier input operatively connected to the converter output and a barrier output operatively connected to the voltage source line, the energy limiting barrier comprising a limit circuit to limit the output voltage at the voltage source line to be less than or equal to the maximum output voltage.

2. A flameproof apparatus in accordance with claim 1, wherein the limit circuit includes a voltage limiting device disposed between the converter output and a common line such that the voltage limiting device connects the converter output to the common line when the converter output voltage exceeds the maximum output voltage.

3. A flameproof apparatus in accordance with claim 2, wherein the voltage limiting device includes a diode.

4. A flameproof apparatus in accordance with claim 2, wherein the voltage limiting device includes redundant diodes.

5. A flameproof apparatus in accordance with claim 2, wherein the voltage limiting device includes a Zener diode.

6. A flameproof apparatus in accordance with claim 2, wherein the voltage limiting device includes redundant Zener diodes.

7. A flameproof apparatus in accordance with claim 1, wherein the limit circuit includes a current limiting device connected with the converter output, wherein the current limiting device operates as to form an open circuit when current from the converter output exceeds a predetermined maximum output current.

8. A flameproof apparatus in accordance with claim 7, wherein the current limiting device includes a fuse.

9. A flameproof apparatus in accordance with claim 1, comprising:
   a further flameproof compliant input connection disposed through the flameproof housing;
   a further flameproof compliant output connection disposed through the flameproof housing; and
   a connection line extending between the further flameproof compliant input connection and the further flameproof compliant output connection,
   wherein the energy limiting barrier comprises a further limit circuit operatively connected to the connection line and configured to limit the connection line voltage to be less than or equal to the maximum output voltage.

10. A flameproof apparatus in accordance with claim 9, wherein the further limit circuit connects the connection line to the barrier output such that the connection line voltage does not exceed the output voltage at the barrier output.

11. A flameproof apparatus in accordance with claim 10, wherein the further limit circuit comprises a diode connecting the connection line to the barrier output.

12. A flameproof apparatus in accordance with claim 9, wherein the further limit circuit connects the connection line to a common line such that the connection line voltage does not drop below a voltage on the common line.

13. A flameproof apparatus in accordance with claim 12, wherein the further limit circuit comprises a diode connecting the connection line to the common line.

14. A flameproof apparatus in accordance with claim 1, comprising a non-flameproof housing receiving the voltage source line from the flameproof housing, and having electrical instruments disposed therein and operatively connected to the voltage source line.

15. A method for operating systems and devices in a hazardous environment without intrinsically safe barriers and without complete enclosure by a flameproof housing, comprising:
   receiving an input power signal from an external power source within a flameproof housing through a first flameproof compliant input connection;
   converting within the flameproof housing the voltage of the input power signal to a converted output voltage that is less than or equal to a predetermined maximum output voltage;
   limiting within the flameproof housing the converted output voltage to be less than the maximum output voltage when the converted output voltage is greater than the maximum output voltage; and
   outputting the limited converted output voltage from the flameproof housing through a flameproof compliant output connection of the flameproof housing.

16. A method in accordance with claim 15, wherein limiting the converted output voltage comprises connecting the converted output voltage through a circuit to a common line when the converted output voltage exceeds the maximum output voltage.

17. A method in accordance with claim 16, wherein connecting the converted output voltage through a circuit to a common line includes connecting the converted output voltage through a diode to the common line.

18. A method in accordance with claim 16, wherein connecting the converted output voltage through a circuit to a common line includes connecting the converted output voltage through redundant diodes to the common line.

19. A method in accordance with claim 16, wherein connecting the converted output voltage through a circuit to a common line includes connecting the converted output voltage through a Zener diode to the common line.

20. A method in accordance with claim 16, wherein connecting the converted output voltage through a circuit to a common line includes connecting the converted output voltage through redundant Zener diodes to the common line.

21. A method in accordance with claim 15, comprising preventing the converted output voltage from reaching the flameproof compliant output connection when the current associated with the converted output voltage exceeds a predetermined maximum output current.

22. A method in accordance with claim 21, wherein preventing the converted output voltage from reaching the flameproof compliant output connection when the current associated with the converted output voltage exceeds a predetermined maximum output current includes forming an open circuit when the current associated with the converted output voltage exceeds the predetermined maximum current.

23. A method in accordance with claim 22, wherein forming an open circuit includes using a fuse.

24. A method in accordance with claim 15, wherein the flameproof housing includes a further flameproof compliant input connection, a further flameproof compliant output connection and a connection line extending between the further input connection and the further output connection, the method further comprising limiting the voltage on the connection line to be less than or equal to the maximum output voltage.

25. A method in accordance with claim 24, wherein limiting the voltage on the connection line includes connecting the connection line to the converted output voltage such that the connection line voltage does not exceed the converted output voltage.

26. A method in accordance with claim 25, wherein connecting the connection line to the converted output voltage includes connecting the connection line to the converted output voltage through a diode.

27. A method in accordance with claim 24, comprising operatively connecting the connection line to a common line such that the connection line voltage does not drop below ground.

28. A method in accordance with claim 27, wherein operatively connecting the connection line to a common line includes connecting the connection line to the common line through a diode.

29. A method in accordance with claim 15, comprising connecting the output connection from the flameproof housing to a non-flameproof housing such that electrical instruments disposed within the non-flameproof housing are operatively connected to the output connection.

30. A local control panel for a process control device located in a hazardous environment comprising:
   a flameproof housing;
   a flameproof compliant input connection disposed through the flameproof housing to receive a wire to connect the local control panel to an external power source;
   a flameproof compliant output connection disposed through the flameproof housing and having a voltage source line;
   a non-flameproof housing;
   an input device disposed within the non-flameproof housing and configured to receive input from a user;
   communications circuitry disposed within the housing and operatively connected to the input device, the communications circuitry configured to detect an input received from a user at the input device and to control the operation of a process control device to be controlled by the local control panel in response to detecting the input from a user at the input device, wherein the voltage output line extends through the outer wall of the non-flameproof housing and is operatively connected to the communications circuitry and the input device;
   a connection line operatively connected to the communications circuitry and configured for connection to a process control device to be controlled by the local control panel, the connection line extending through the non-flameproof housing; and
   circuitry disposed within the flameproof housing to convert the voltage from the external power source to a converter output voltage that is less than or equal to a predetermined maximum output voltage, to output the converter output voltage on the voltage source line, and to limit the output voltage at the voltage source line to be less than or equal to the maximum output voltage.

31. A local control panel in accordance with claim 30, wherein the circuitry enclosed within the flameproof housing comprises:
   a voltage converter having a converter input connected to the flameproof compliant input connection and having a converter output, wherein the voltage converter converts the voltage from the external power source voltage to a converter output voltage that is less than or equal to the maximum output voltage; and
   an energy limiting barrier operatively connected to the converter output and a barrier output operatively connected to the voltage source line, the energy limiting barrier comprising a limit circuit to limit the output voltage at the voltage source line to be less than or equal to the maximum output voltage.

32. A local control panel in accordance with claim 31, wherein the limit circuit includes a voltage limiting device disposed between the converter output and a common line such that the voltage limiting device connects the converter output to the common line when converter output voltage exceeds the maximum output voltage.

33. A local control panel in accordance with claim 31, wherein the limit circuit includes a current limiting device connected with the converter output, wherein the current limiting device operates as to form an open circuit when current from the converter exceeds a predetermined maximum output current.

34. A local control panel in accordance with claim 31, wherein the flameproof housing includes a further flameproof compliant input connection and a further flameproof compliant output connection, wherein the connection line extends between the further flameproof compliant input connection and the further flameproof compliant output connection, the circuitry within the flameproof housing comprising a further limit circuit operatively connected to the connection line and configured to limit the connection line voltage to be less than or equal to the maximum output voltage.

35. A local control panel in accordance with claim 34, wherein the further limit circuit connects the connection line to the barrier output such that the connection line voltage does not exceed the output voltage at the barrier output.

36. A local control panel in accordance with claim 34, wherein the further limit circuit connects the connection line to a common line such that the connection line voltage does not drop below a voltage on the common line.

37. A local control panel in accordance with claim 31, comprising an output device operatively connected to the communication circuitry, wherein the communication circuitry is configured to cause the output device to output a visual indication of the status of a process control device to be controlled by the local control panel.

38. A local control panel in accordance with claim 30, comprising:
   a further flameproof compliant input connection disposed through the flameproof housing to receive a wire to connect the local control panel to a further external power source;
   a further flameproof compliant output connection disposed through the flameproof housing and having a further voltage source line;
   further circuitry disposed within the flameproof housing to convert the voltage from the further external power source to a further converter output voltage that is less than or equal to the maximum output voltage, to output the further converter output voltage on the further voltage source line, and to limit the output voltage at the further voltage source line to be less than or equal to the maximum output voltage; and
   a switch disposed within the non-flameproof housing and operatively connected to the voltage source lines, to the communications circuitry, and to the input device, wherein the switch is operable to alternately connect one of the voltage source lines to the communications circuitry and the input device.

39. A local control panel in accordance with claim 30, wherein the communications circuitry is configured to control the operation of an emergency shutdown valve in response to detecting input at the input device.

* * * * *

UNITED STATES PATENT AND TRADEMARK OFFICE
CERTIFICATE OF CORRECTION

| | | |
|---|---|---|
| PATENT NO. | : 7,852,610 B2 | Page 1 of 1 |
| APPLICATION NO. | : 11/626760 | |
| DATED | : December 14, 2010 | |
| INVENTOR(S) | : Uhlenberg et al. | |

It is certified that error appears in the above-identified patent and that said Letters Patent is hereby corrected as shown below:

In the Specification:

At column 2, line 32, "approach" should be -- approach, --.

At column 3, line 23, "FSD" should be -- ESD --.

At column 3, line 52, "valve; and" should be -- valve; --.

At column 3, lines 55-56, "FIG. 1." should be -- FIG. 1; and --.

At column 7, line 4, "Supply, or" should be -- supply, or --.

At column 7, line 19, "Fixed" should be -- fixed --.

Signed and Sealed this
Ninth Day of June, 2015

Michelle K. Lee
*Director of the United States Patent and Trademark Office*